United States Patent
Wise et al.

[15] 3,703,305
[45] Nov. 21, 1972

[54] SPRING CLIP RETAINER

[72] Inventors: George L. Wise; Mark A. Russ, both of Muncie, Ind.

[73] Assignee: Borg-Warner Corporation, Chicago, Ill.

[22] Filed: June 1, 1971

[21] Appl. No.: 148,373

[52] U.S. Cl..............................287/52.05, 287/53 LK
[51] Int. Cl................................................F16d 1/06
[58] Field of Search.........287/52.05, 53 LK, 53 TK, 52.07; 85/8.3; 151/8

[56] References Cited

UNITED STATES PATENTS

| | | |
|---|---|---|
| 1,199,448 | 9/1916 | Burnett..........................151/8 |
| 2,434,935 | 1/1948 | Kroon.....................287/53 LK |
| 3,388,934 | 6/1968 | Chapman, Jr. .........287/52.05 |
| 3,561,799 | 2/1971 | Hutchinson ............287/52.05 |
| 1,913,555 | 6/1933 | Lyle..............................85/8.3 |

FOREIGN PATENTS OR APPLICATIONS

| | | |
|---|---|---|
| 593,960 | 6/1925 | France...........................151/8 |
| 546,082 | 7/1956 | Italy...............................151/8 |

*Primary Examiner*—Andrew V. Kundrat
*Attorney*—Donald W. Banner, William S. McCurry and Robert L. Zieg

[57] ABSTRACT

A spring clip formed with a stop means on one end, a bight to engage a shaft and a resilient end forming another stop means for detachably securing a hub to a shaft.

1 Claim, 3 Drawing Figures

PATENTED NOV 21 1972
3,703,305
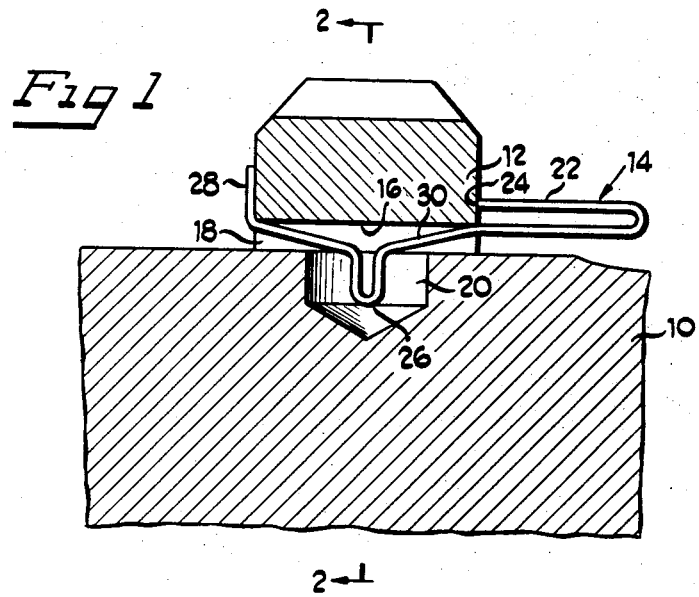
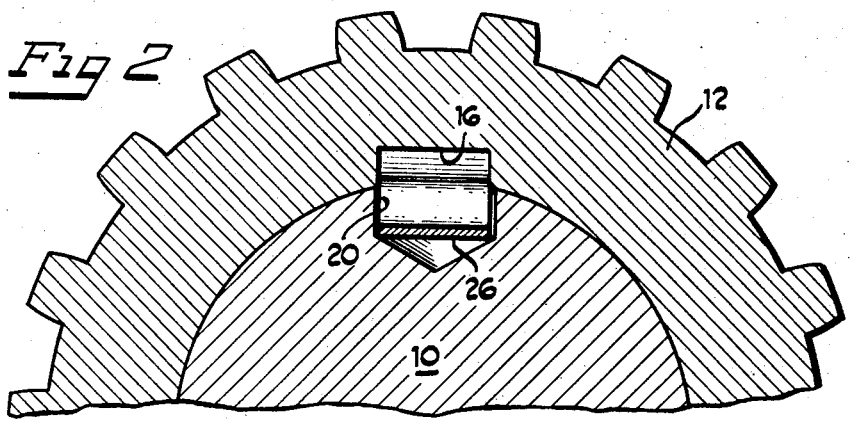
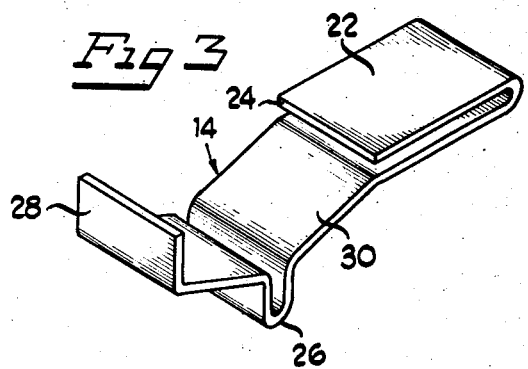
INVENTORS
MARK A. RUSS
GEORGE L. WISE
BY Robert L. Zieg
ATTORNEYS

SPRING CLIP RETAINER

BACKGROUND OF THE INVENTION

This invention relates in general to a means for attaching an annular member to a cylindrical member. More specifically, it relates to a simple and economical method of detachably securing a hub to a shaft and holding the hub against relative rotation with respect to said shaft, or axial movement thereon.

SUMMARY OF THE INVENTION

The features of this spring clip include the economical method of manufacture of the clip, the ease and speed with which it can be installed and the simplicity of its design.

This clip is economical to manufacture because only a bending operation is required. Known devices of this type require a metal shearing operation. The clip made by the bending process provides a loop or bright for engaging the shaft. Besides providing a double thickness of metal for contacting the shaft this bight provides a closer fit in the engaging hole in the shaft and a stronger tab because the metal is not weakened by a shearing operation.

This and other features of the invention will now be described in detail in the specification and then pointed out more particularly in the appended claims.

DESCRIPTION OF THE DRAWINGS

FIG. 1 is a cross-sectional view of a portion of an automotive power transmission showing a gear attached to a shaft of the unit in accordance with the teaching of the present invention;

FIG. 2 is a sectional view taken along the line 2—2 of FIG. 1; and

FIG. 3 is a perspective view of the spring clip of FIG. 1.

In FIG. 1 a drive shaft 10 is shown with a gear or hub 12 fixed to the shaft by means of a spring clip 14. The shaft 10 may, for example, be the output shaft of an automotive power transmission and the gear 12 a spiral gear adapted to drive the speedometer of an automotive vehicle. The spring clip 14 provides a means to quickly attach a hub to a shaft with maximum reliability and a minimum cost.

The gear or hub 12 is designed with a bore 16 therethrough which fits snugly over the shaft 10. The bore 16 has an axial groove 18 therein which is open at both ends of the bore 16.

The shaft 10 has a radilly inwardly extending hold 20 therein.

The spring clip 14 is formed of an elongated strip of spring steel having a width slightly smaller than the groove 18 in the gear or hub 12. In general, the clip 14 has a generally flat longitudinally extending main portion 30, end portions 22 and 28 at either end thereof, and a generally central bight portion 26. The hold 20 in the shaft 10 has a diameter slightly larger than the width of the groove 18 and the spring clip 14. One end of the spring clip 14 is formed with an elongated end portion 22 of the strip reversed over the main body of the clip forming a springy handle by which the clip may be deformed for installation. The end of this reversed end portion 22 forms a stop means 24 which abuts the gear or hub 12 on one side thereof when the clip is in place. A bight 26 is formed in the intermediate portion of the clip, as shown in FIG. 3. This bight, as best illustrated in FIG. 3, is formed by folding a section of said intermediate portion upon itself at approximately a right angle to the main portion 30 thereof. The bight 26 is adapted to fit in the hole 20 in the shaft 10 and thereby prevent movement of the clip 14 relative to the shaft 10 in both an axial and rotational sense. Opposite the stop means 24 of the clip 14 is another stop means formed of an end portion 28 by bending the strip upward at approximately a right angle to the main portion 30 thereof. The stop means thus formed is substantially the same distance from the stop means 24 as the width of the gear or hub 12.

To assemble the gear or hub 12 to the shaft 10, the spring clip is placed on the shaft with the bight portion 26 inserted into the hole 20. The gear or hub 12 is slid over the shaft 10 with the groove 18 aligned with the spring clip 14. The elongated end portion 22 is deflected downwardly as the gear or hub 12 is slid over the clip until it engages the stop means on one side of the gear. When the elongated end portion 22 is released, the stop means 24 engages the other side of the gear or hub 12 and secures it from axial movement along shaft 10. The bight portion 26 engaging the hole 20 in the shaft 10 secures the clip 14 to the shaft 10 both axially and rotationally. The clip 14 engaging the groove 18 fixes the gear or hub against relative rotation with respect to the shaft 10.

While the invention has been described in considerable detail in the foregoing specification, it will be understood that several modifications thereof will readily suggest themselves to those skilled in the art and the breadth of the invention is not to be limited to the details of the description but reference is to be had to the appended claims for the scope thereof.

What is claimed is:

1. A hub, a shaft and a spring clip for securing said hub to said shaft, said hub having a central bore closely fitting said shaft, said bore having a groove therein open at both ends, said shaft having a radially inwardly extending hole therein, said spring clip being of a strip of metal having a first end portion reversed upon itself forming a stop means, an intermediate portion having a bight formed therein by folding said strip upon itself, said bight being formed in the opposite direction from the stop means of said first end portion and at a generally right angle thereto, another end portion having a stop means formed by bending said other end portion at right angles to said strip and in the same direction as said first end portion, said spring clip securing said hub to said shaft in an axial sense by engagement of the bight portion thereof in the hole in said shaft and by the end portion stop means engaging the sides of said hub, said spring means further securing said hub to said shaft for rotation therewith by engagement of said clip in said groove of said hub.

* * * * *